Sept. 3, 1935.    W. E. GOLDSBOROUGH    2,013,630
AUTOMATIC WELDER
Filed Aug. 12, 1931    6 Sheets-Sheet 1
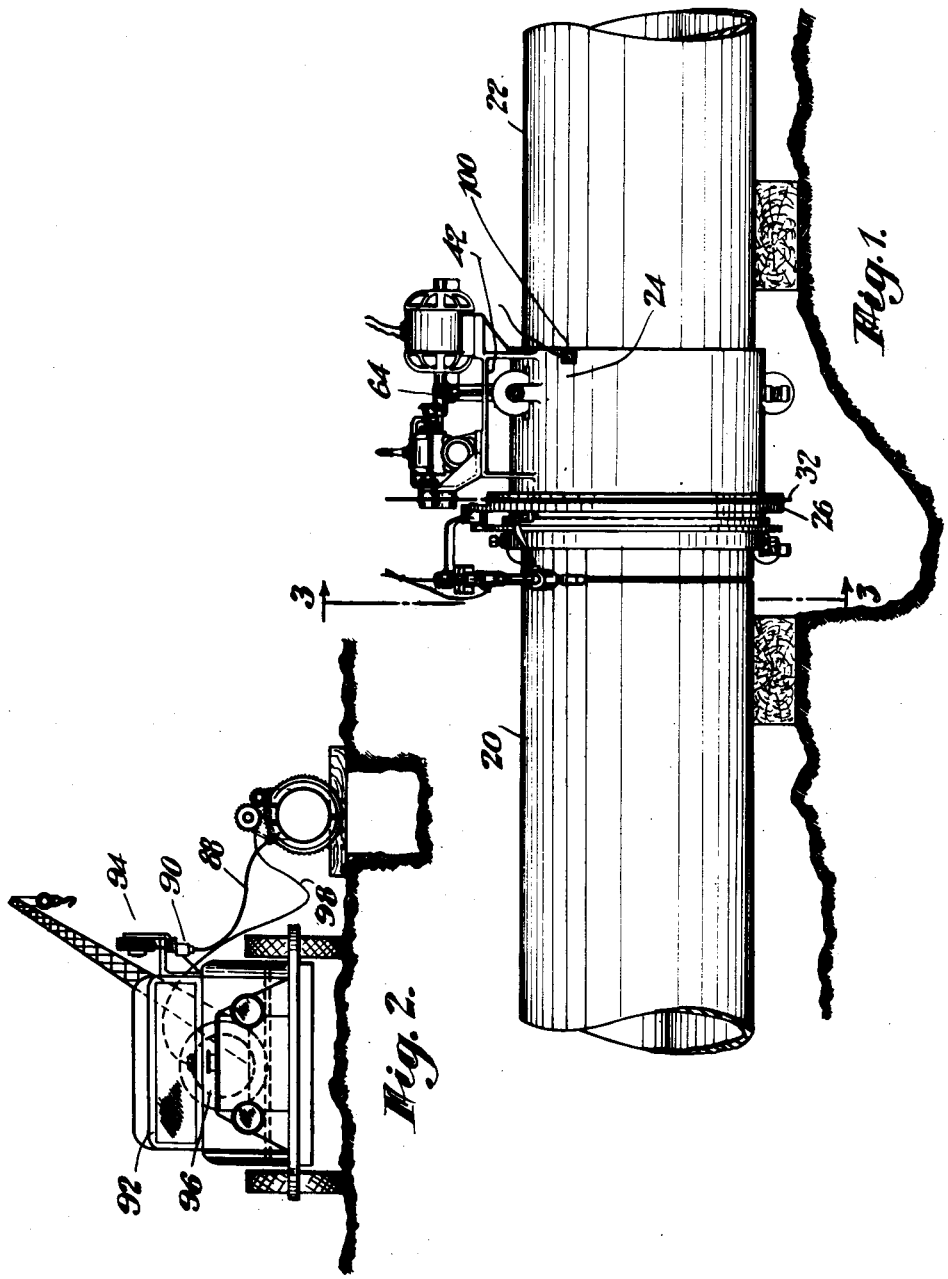
WINDER E. GOLDSBOROUGH
INVENTOR
BY *Edmund G. Borden*
ATTORNEY

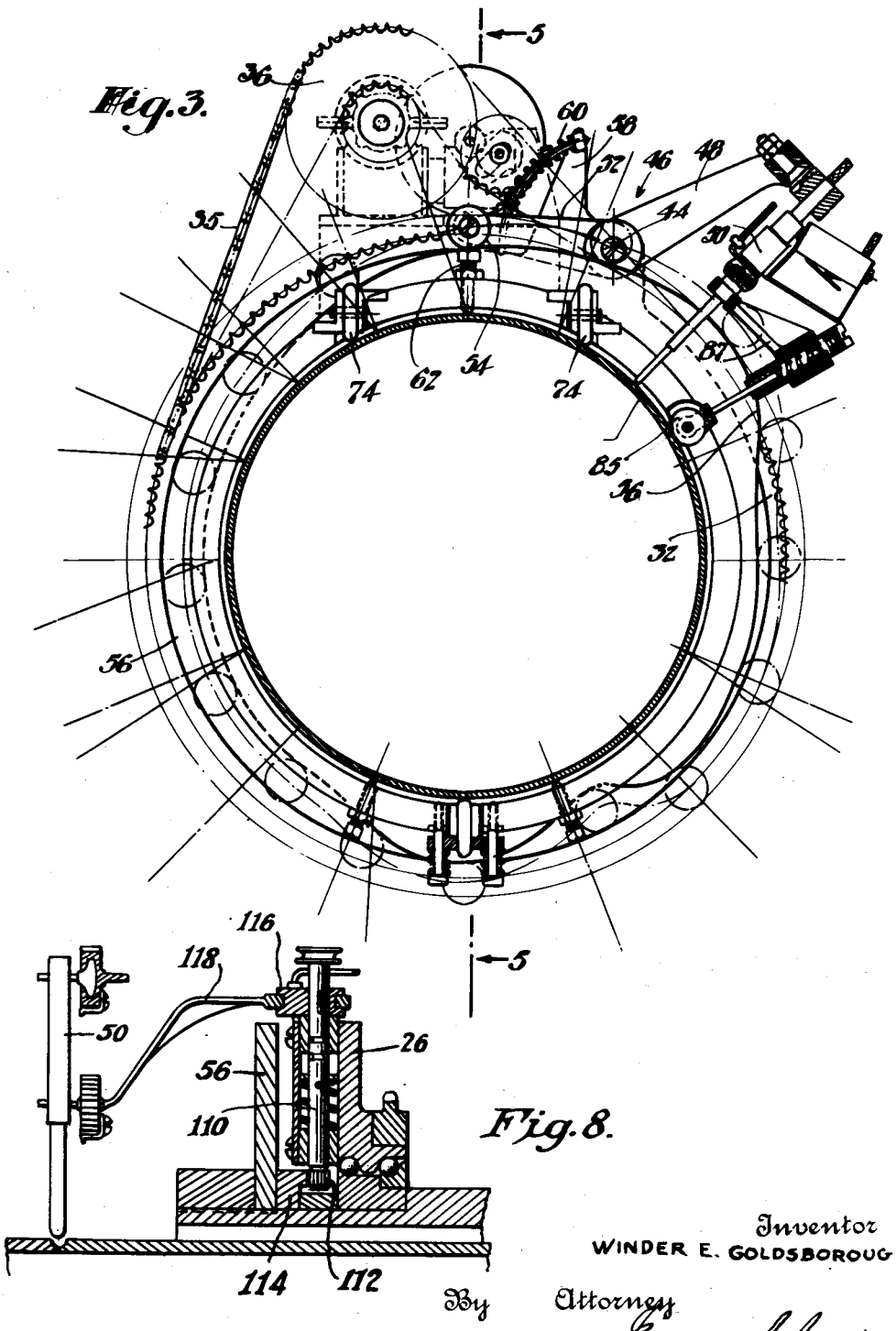

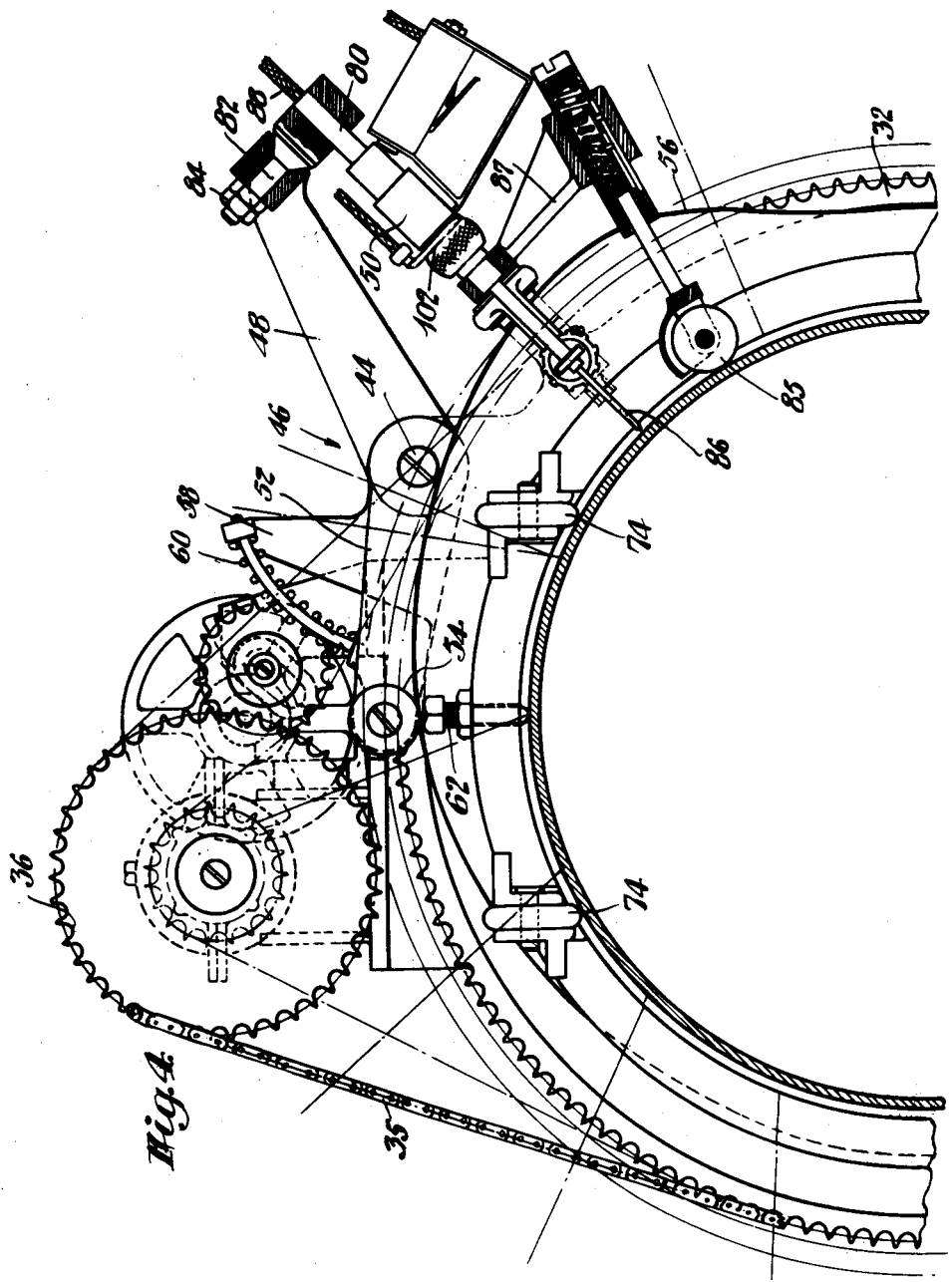

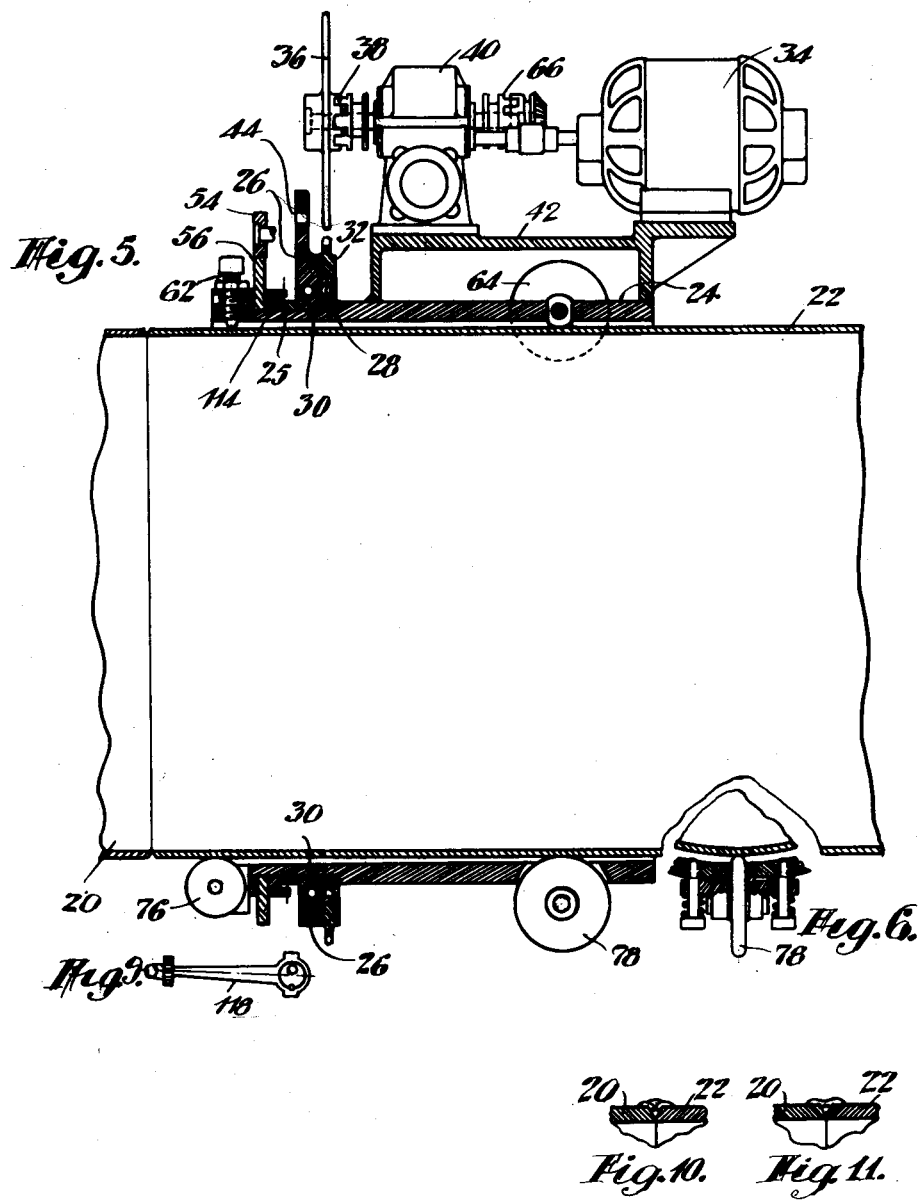

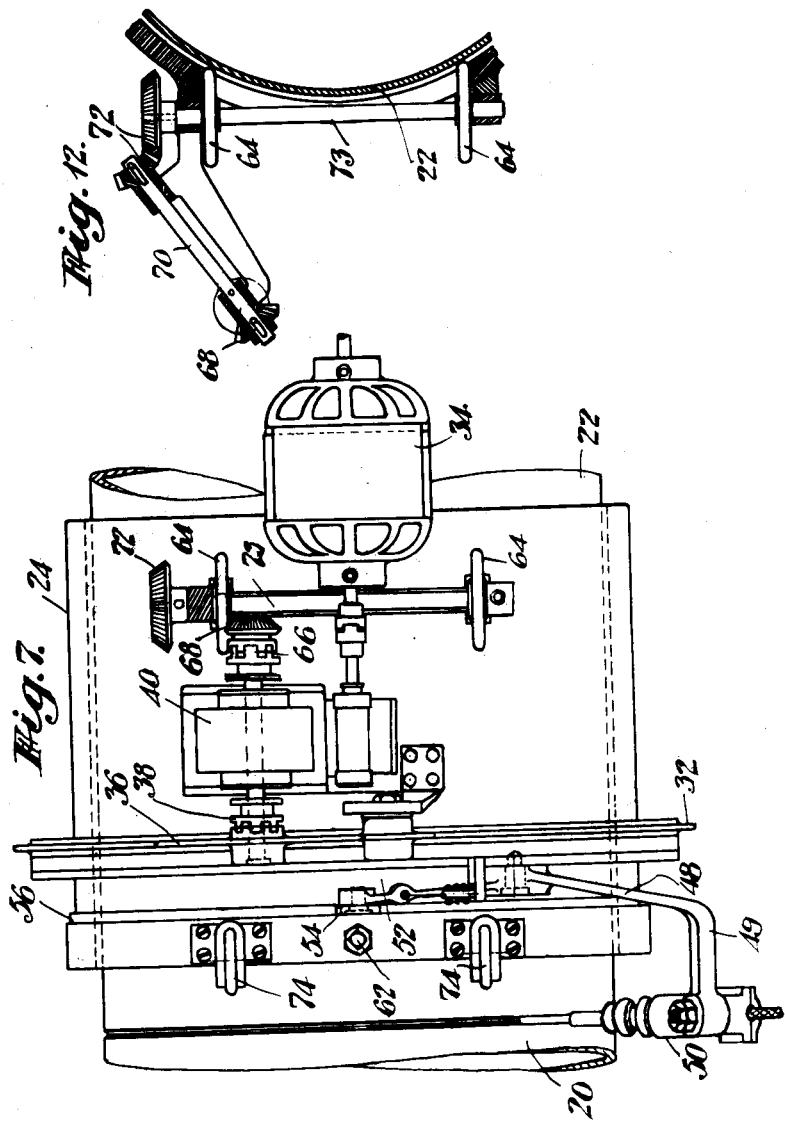

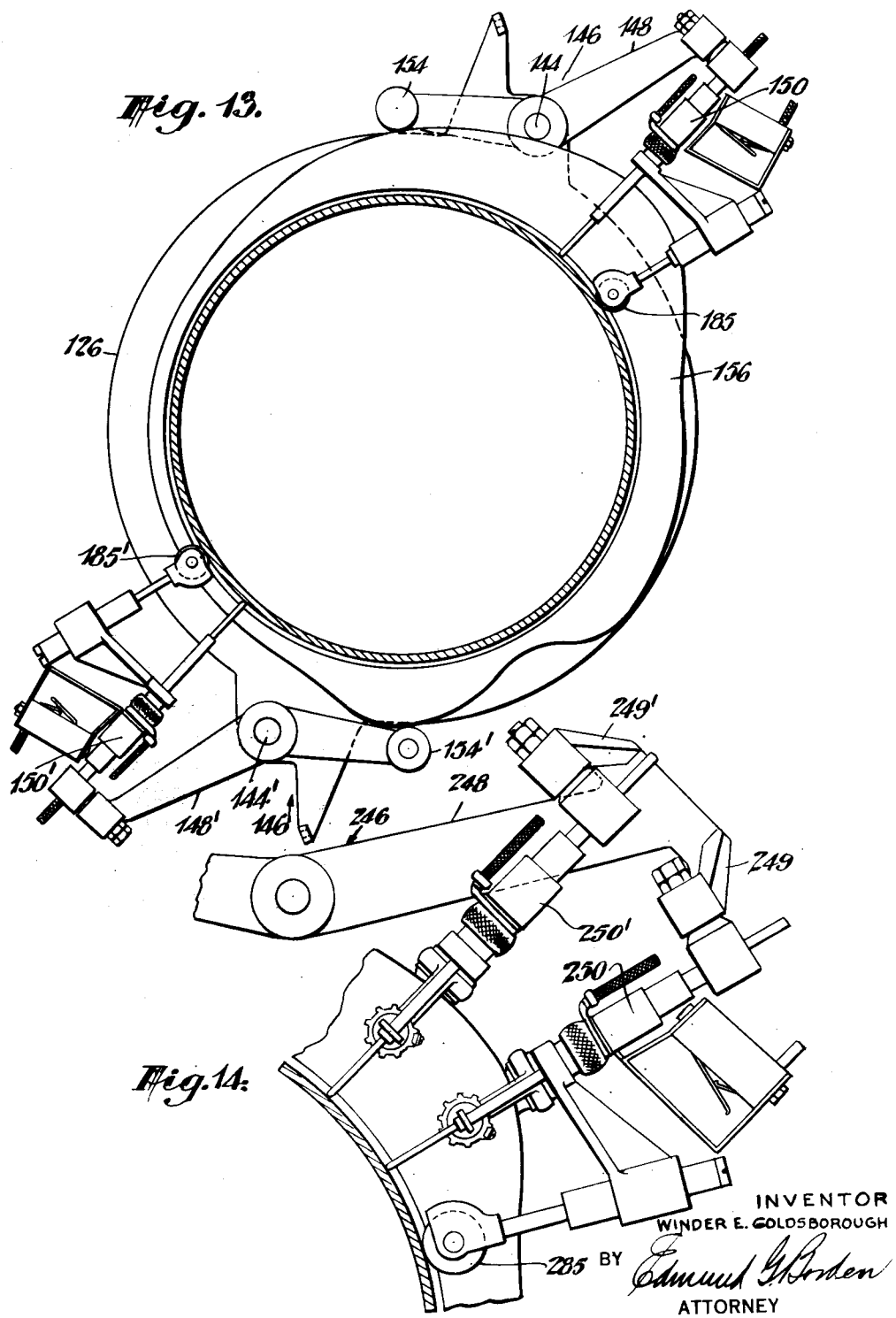

Patented Sept. 3, 1935

2,013,630

UNITED STATES PATENT OFFICE 2,013,630

AUTOMATIC WELDER

Winder E. Goldsborough, South Norwalk, Conn., assignor to Doherty Research Company, New York, N. Y., a corporation of Delaware Application August 12, 1931, Serial No. 556,566

8 Claims. (Cl. 219—6)

This invention relates to the art of welding and has for its principal object the provision of a means for and method of welding cylindrical articles.

More particularly this invention relates to the welding together of pipe sections in pipe line construction and it is a further object of this invention to provide a rapid, efficient and automatic means for effecting such welding in the field.

It has heretofore been the practice in welded pipe line construction to weld together a number of pipe sections, either before or after the same were lowered into the trench, the welding being effected by holding the welding head or torch above the sections to be joined, and rotating the pipe sections as the weld progressed, a procedure which is more particularly disclosed in the patent to Fraser No. 999,982.

This arrangement permits the welding apparatus to be held stationary above the work with the weld in full view of the operator, and since such welding is done manually good vision is essential to good workmanship.

One of the difficulties encountered in following this procedure resides in the fact that a large crew is required along the sections so joined to rotate the same while the welds are being made. Where the pipe line is large as for example in 24″ natural gas lines, this difficulty is greatly increased.

It is a further object of this invention to effect the welding together of pipe sections in the field while the same are stationary thereby dispensing with a part of the large crews heretofore used on such work.

To this end, it is a feature of this invention to provide an apparatus in which the welding element moves circumferentially of the pipe, thereby avoiding the necessity of rotating the pipe sections. This circumferential motion being preferably effected by a motor mounted upon the same carriage which supports the welding mechanism.

It is well-known that the action of welding apparatus differs, when the welder is held above the work, from the action when it is held below the work, since in the first instance, the effect of gravity tends to pull the moulten metal toward the work, while in the second case the action is the reverse.

It is a further object of this invention to compensate for the different action of the welding element when working directly against gravity, or at some intermediate position, as compared with its action when working directly with gravity, in such a manner that the seam shall be uniform throughout.

To this end, it is a feature of this invention to vary the angle the welding electrode makes with a perpendicular to the surface of the work to compensate for the different action of the arc at different points about the circumference of the article being welded.

It is a further object of this invention to provide an automatic welding apparatus capable of following irregularities in the joint or seam to be welded.

To this end it is a feature of this invention to so mount the electrode that it may oscillate slightly in response to movements of a seam follower such as a roller attached thereto.

It is a further object of this invention to provide a mechanism capable of effecting welded joints which extend either longitudinally or circumferentially of the cylindrical object.

To this end it is a feature of this invention to provide a construction in which the carriage bearing the welding electrode is movable longitudinally of the object, which in conjunction with the circumferential motion previously mentioned permits the welding electrode to be moved in any desired direction.

It is a further object of this invention to provide an automatic pipe welding apparatus capable after the completion of each weld, of moving along the pipe to the next joint under its own power.

To this end, it is a further object of this invention to provide a carriage bearing a welding apparatus and having rollers which rest upon the work, one or more of which may be driven by a motor which may be the same motor which moves the welding element circumferentially of the work.

These and other objects of the invention will be apparent to those skilled in the art from a consideration of the following detailed description taken in conjunction with the accompanying drawings, in which:

Fig. 1 shows a side view of a welding apparatus according to the present invention as it appears in operation;

Fig. 2 illustrates the relation between the welding apparatus and an attending truck;

Fig. 3 shows on an enlarged scale a section taken on line 3—3 of Fig. 1, looking in the direction of the arrows, and in dotted lines the relation of a cam roller to an electrode adjusting cam at various positions about the circumference of the work and also indicating diagrammatically the required angular relation between the work and a welding electrode at corresponding positions;

Fig. 4 is a view corresponding to the upper portion of Fig. 3 on an enlarged scale;

Fig. 5 is a longitudinal section taken on line 5—5 of Fig. 3, parts being shown in the side elevation;

Fig. 6 is a detail of a carriage roller illustrating the manner of mounting the same and is taken at right angles to its position in Fig. 5;

Fig. 7 is a top plan view of the welding apparatus as the same appears in position, parts being omitted for the sake of clearness;

Fig. 8 illustrates a mode of positively oscillating a welding element across a joint while the same is also moving thereabout;

Fig. 9 shows a top plan view of an arm of the combination of parts effecting the oscillation;

Figs. 10 and 11 illustrate different types of welds which the apparatus is capable of effecting;

Fig. 12 illustrates a detail of parts of the connection between the motor and the driving rollers of the carriage;

Fig. 13 is a view similar to Fig. 3, but omitting many parts for the sake of clearness, and showing how a plurality of electrodes are mounted for simultaneous operation; and Fig. 14 illustrates a detail of a modified form of the invention in which a plurality of electrodes are supported from the same arm.

Referring to the drawings, reference numerals 20 and 22 indicate pipe sections to be welded. A cylindrical collar 24 of larger internal diameter than the external diameter of the pipe sections 20 and 22 is adapted to encircle the same and form a supporting carriage for the major portion of the elements comprising the mechanism. As may be seen more particularly in connection with Fig. 5, the cylindrical carriage 24 is of uniform internal diameter and has an externally reduced portion 25 adjacent one end thereof upon which is mounted an annulus forming a carrier 26 adapted to rotate about the carriage 24 on ball bearings 28 retained in a holder 30. A sprocket 32 is rigidly attached to the carrier 26 and is adapted to be driven by an electric motor 34 through the intermediary of a chain 35, a drive sprocket 36, a clutch 38 and a speed reduction gearing 40. The motor 34 and the speed reduction gearing 40 are rigidly mounted on a supporting stand 42 which is in turn welded or otherwise attached to the carriage 24.

The annular carrier 26 bears a pivot 44 upon which is mounted a lever 46, one arm 48 of which has an outward extension 49 which projects beyond the edge of carriage 24 to carry an electrode holder 50, and the other arm 52 of which carries a roller 54 which is adapted to ride on a cam 56. The cam 56 encircles and is rigidly mounted on the reduced end of carriage 24 adjacent to and parallel with the carrier 26. A projection 58 extends from the carrier 26 supporting a spring 60 adapted to hold the roller 54 of lever 46 against cam 56.

The collar 24 is provided with a set screw 62 adapted to hold the same in fixed position when the device is to be held stationary and two pairs of rollers 64 and 74 upon which the apparatus is adapted to rest when the same is being moved along the pipe from section to section, the first pair 64 being propelled from the motor 34 through the intermediary of the speed reduction gearing 40, a clutch 66, gearing 68, a shaft 70 and bevel gear 72, one of which gears is fixed to a shaft 73 upon which the rollers 64 are mounted. The second pair of rollers 74 supports the end of the collar 24 opposite the rollers 64. Two spring pressed rollers 76 and 78 are positioned in the lower portion of the collar 24 and bear against the lower portion of the pipe section to maintain the apparatus firm and steady relative to the pipe sections during operation.

The electrode holder 50 is formed of a tubular body portion 80 which is detachably fastened at one end by a bolt 82 and nuts 84 to the extension 49 of lever arm 48. It will be observed that this form of fastening means permits the electrode holder 50 to swivel allowing the end thereof opposite to the fastening means to be shifted slightly longitudinally of the pipe while the carriage 24 remains stationary. This swivelling action permits the electrode to follow the irregularities of the groove or joint along which it is guided by a spring pressed roller 85 connected thereto by an arm 87, or in certain instances to be positively actuated back and forth across the weld as will be hereinafter more particularly described.

A wire electrode 86 extends through the holder 50 and projects toward and in close proximity to the surface of the work. Flexible tubing 88 extends from the outer end of the holder 50 to an electrode feeding mechanism 90 which in the instance shown is mounted upon an attending truck 92. Also mounted upon the truck 92 and immediately above the feeding mechanism 90 is a spool of welding wire 94 from which wire for the welding arc is unrolled by feeding mechanism 90 when the device is in operation.

Electrode feeding mechanism 90 may be of any known type which is capable of maintaining a substantially constant arc length. The type here shown and which has proven satisfactory in service is of the form in which the mechanism for moving the wire forming the electrode up or down is governed by an oscillating air nozzle controlled from a solenoid connected across the arc. Air for the nozzle is supplied by an air compressor which is mounted in truck 92.

The truck 92 also carries a direct current generator 96 from which current is supplied to the welding arc through wires enclosed in flexible tubing 98, the positive lead being connected to the carriage 24 as indicated at 100 which is the equivalent of grounding it to the work and the negative lead being connected to electrode holder 50 as indicated at 102 at which point direct contact with the fusible wire 86 forming the negative electrode is obtained.

In operation assuming the apparatus is in the position shown in the drawings with the electrode 86 adjacent the joint to be welded, the welding circuit may be closed and the motor 34 started. An arc will at once be struck between the electrode 86 and the work due to the action of the feeding mechanism 90 forcing wire electrode 86 into contact with the work and quickly withdrawing it as the current flows through the circuit so formed. Once the arcing relation is established, the motor 34 acting through speed reduction gearing 40 and sprockets 36 and 32 rotates the annular carrier 26 about the cylindrical carriage 24 which forms its axle. This moves the pivot 44 of the lever 46 about the carriage and the arm 48 of the same with its outward extension 49 directs the electrode 86 toward the seam or joint to be welded while moving the same thereabout. The feeding mechanism 90 maintains the tip of the electrode 86 at a constant distance from the work while the seam following roller 85 adjusts the electrode to any minor irregularities in the seam. The opposite arm 52 of the lever 46 carrying the cam follower 54 changes the angularity of the electrode 86 with respect to the work in accordance with the variations in the contour of the cam 56. The electrode angles which have been found most practicable at various points about the circumference of the work are indicated in Fig. 3.

It will be observed that these angular positions are not the same on both sides of the pipe. This is due largely to the fact that on one side the electrode moves downwardly adding a force to the action of gravity while on the other it moves upwardly so that one of the components of the forces acting upon the molten metal from the electrode before it strikes the work acts in an upwardly direction opposed to gravity.

It will be understood that the angular relations here shown are not solely the result of an analysis of the various forces acting upon the molten metal during its passage between electrode and work. Rather, such analysis provided the theoretical basis for experimental determination and the angles here given have been determined by experiments to give the best results.

After an initial bead has been laid down in the groove, the welding current is cut off and the direction of rotation of the carrier 26 reversed to bring the electrode 86 back to its initial position. The process may then be repeated and the weld built up to any desired height.

Upon the completion of each weld, if it has been previously set, the screw 62 is loosened, the clutch 38 disengaged and the clutch 66 engaged. The apparatus can then be driven by the motor 34 along the pipe to that next joint, while the attending truck 92 advances beside it.

If desired the weld may be built up by moving the carrier 26 more slowly and oscillating the electrode back and forth across the desired joint. The means for effecting such welds is shown in Figs. 8 and 9 in which a spindle 110 rotatably mounted in carrier 26 is provided at its lower end with teeth 112 adapted to mesh with an annular gear 114. The upper end of the spindle is provided with an eccentric 116 to which is strapped an arm 118. The outer end of the arm 118 bends downwardly to connect with the lower end of the electrode holder 50.

By this arrangement upon movement of the carrier 26 the spindle 110 rotates, which rotation is translated by the eccentric 116 into reciprocation of arm 118. This reciprocation causes the electrode holder 50 to oscillate slightly with bolt 82 as an axis. The nature of the weld formed by this action may be seen in Fig. 11.

The time which the apparatus requires to complete a given weld may be materially decreased by the provision of a plurality of electrodes adapted to function simultaneously. These may be added to the structure so far described by the substitution of interchangeable parts and without undue complication in various ways, two of which are illustrated in Figs. 13 and 14.

Referring to Fig. 13 reference numeral 126 indicates an annular carrier similar to carrier 26 of the previously described construction save that it is provided with two diametrically opposite pivots 144 and 144' instead of single pivot 44. These pivots are adapted to support two levers 146 and 146' each of which is similar in all respects to levers 46 and which carry electrode holders 150 and 150' at one end and cam followers 154 and 154' at the other. Both cam followers ride on a single cam 156, the only duplication of parts necessary residing in the provision of an additional electrode feeding mechanism for each electrode added.

It will be seen that this construction completes a single bead on a movement of the carrier 126 through but 180° and an entire weld of the type shown in Fig. 10 is completed in but one half the number of revolutions required by an annulus carrying but a single electrode.

A further arrangement involving a plurality of electrodes is illustrated in Fig. 14 in which a lever 246 having one arm 246 carrying two outward extensions 249 and 249' is substituted for lever 46. By this construction two electrode holders 250 and 250' are supported by the same lever and since they are positioned closely together but a single cam 256 is necessary to give them the proper annular direction. It will be understood that in other respects this construction is the same as the previously described construction and may be utilized to lay down similar welds. It is particularly adapted however for effecting a weld of the type disclosed in Fig. 11, this being accomplished by permitting the first electrode of the series to follow freely the seam-following roller 285—while the other electrode is oscillated back and forth across the weld as the two electrodes advance by use of oscillator illustrated in Figs. 8 and 9. When so operated the first electrode in this construction lays down an initial bead while the second electrode completes the weld filling in the remainder of the groove and lapping over upon the pipe sections as illustrated in Fig. 11.

While the invention has been particularly described in connection with the welding of joints in pipeline construction wherein it is particularly useful it will be understood that in many of its aspects the invention is applicable to the welding of any cylindrical object and in some aspects the invention presents features of every general application.

While there is herein described a preferred embodiment of the invention it will be obvious to those skilled in the art that the apparatus is susceptible to many modifications in the design and arrangement of parts within the scope of the appended claims.

Having thus described my invention, what I claim as new is:

1. An apparatus for welding pipe sections along a circumferential seam comprising a carriage adapted to slip over the pipe to be welded with a slight clearance therebetween, means for holding said carriage stationary relative to said pipe, a movable element mounted on said carriage and adapted to rotate about the circumference thereof, a motor on said carriage for driving said movable element, an electrode mounted on said movable element and adapted to project beyond the end of said carriage, means for maintaining the electrode in arcing relation to the desired seam, and means for compensating for the different action of gravity upon the arc in different horizontal planes.

2. In an arc welding machine for welding metal pipe in pipeline construction, a carriage adapted to rest on the external surface of a pipe, an arc welding electrode mounted on said carriage for movement circumferentially of said pipe, and means for compensating for the different action of gravity upon the arc in different horizontal planes.

3. In a welding machine for welding pipe sections together in pipeline construction, a carriage adapted to move along the external surface of a pipe and a welding device mounted on said carriage to rotate about said pipe, and means for compensating for the different action of gravity upon the arc in different horizontal planes.

4. A welding machine for welding abutting pipe sections together comprising an arc welding device, means for moving said arc welding device about the pipe sections adjacent the line of abutment to weld the same together and means for compensating for the different action of the arc in different horizontal planes during the course of such rotation to maintain the seam uniform.

5. An apparatus for welding cylindrical objects circumferentially, comprising a carriage adapted to rest on the external surface of the object, a holder for a welding element movably mounted on the carriage for rotation about the object, mechanism for rotating said holder whereby a circumferential weld can be made on said object, and means operatively connected with said holder and adapted to compensate for the different action of gravity upon the welding operation as the welding element is rotated about the object.

6. An apparatus for welding a cylindrical object circumferentially, comprising a carriage adapted to rest on the external surface of the object, a holder for a welding element movably mounted on the carriage for rotation about the object, and means associated with said holder for compensating for the different action of gravity upon the welding operation when the welding element is rotated about the object, said means including a cam supported by said carriage, and a cam follower adapted to ride on said cam and operatively connecting said cam with said holder.

7. An apparatus for welding a cylindrical object circumferentially, comprising a carriage adapted to rest on and move longitudinally of the object, an annulus mounted to move circumferentially of said carriage and disposed coaxially therewith, a cam extending around said carriage parallel with said annulus, a lever pivotally mounted on said annulus, a roller on one end of said lever adapted to ride on said cam, an electrode holder mounted on the opposite end of said lever and carrying a fusible electrode projecting toward said object, an electric circuit in which said object forms one electrode and said fusible electrode forms the other electrode of a welding arc, and means mounted on said carriage for rotating said annulus at different speeds.

8. In an arc welding machine for welding metal pipe in pipeline construction, a carriage adapted to rest on a pipe, a plurality of arc welding electrodes mounted on said carriage for movement circumferentially of said pipe, a seam follower attached to one of said electrodes, and means attached to another of said electrodes for oscillating the same across said seam.

WINDER E. GOLDSBOROUGH.